(12) United States Patent
Sekiguchi (10) Patent No.: US 7,695,127 B2
(45) Date of Patent: Apr. 13, 2010

(54) RECORDING LIQUID, LIQUID CARTRIDGE, LIQUID DISCHARGE DEVICE, AND LIQUID DISCHARGE METHOD

(75) Inventor: Hideki Sekiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 11/611,566

(22) Filed: Dec. 15, 2006

(65) Prior Publication Data

US 2007/0139501 A1 Jun. 21, 2007

(30) Foreign Application Priority Data

Dec. 19, 2005 (JP) .......................... P2005-365234

(51) Int. Cl.
*G01D 11/00* (2006.01)
(52) U.S. Cl. ........................................ 347/100; 347/95
(58) Field of Classification Search ................. 347/100, 347/95, 96, 101; 106/31.6, 31.13, 31.27; 523/160
See application file for complete search history.

(56) References Cited

U.S. PATENT DOCUMENTS

2005/0076807 A1* 4/2005 Ogawa et al. ............ 106/31.49
2005/0264629 A1* 12/2005 Fukuda et al. ............... 347/100

FOREIGN PATENT DOCUMENTS

| | | |
|---|---|---|
| JP | 56-057862 | 5/1981 |
| JP | 60-23793 | 6/1985 |
| JP | 06-157959 | 6/1994 |
| JP | 08-170041 | 7/1996 |
| JP | 2002-036522 | 2/2002 |
| JP | 2003-003100 | 1/2003 |
| JP | 2003-128970 | 5/2003 |
| JP | 2003-253167 | 9/2003 |
| JP | 2004-168794 | 6/2004 |
| WO | WO05/54382 | 6/2005 |

OTHER PUBLICATIONS

Japanese Patent Office Action corresponding to Japanese Serial No. 2005-365234 dated Jan. 5, 2010.

* cited by examiner

*Primary Examiner*—Manish S Shah
(74) *Attorney, Agent, or Firm*—Sonnenschein Nath & Rosenthal LLP

(57) ABSTRACT

A recording liquid to be attached in a droplet state to an object for the purpose of recording on the object is disclosed, which contains at least one alkylene glycol selected from 1,2-pentanediol, 1,2-hexanediol and 1,3-hexanediol, thereby adjusting a zero second dynamic surface tension thereof at 35 mN/m or more and not more than 40 mN/m and contains a surfactant, thereby adjusting a static surface tension thereof which is satisfied with the following numerical expression (1):

$$(\gamma_{dst0}-3) \leq \gamma_{sst} \leq (\gamma_{dst0}-1) \qquad (1)$$

wherein $\gamma_{dst0}$ [mN/m] represents a zero second dynamic surface tension; and $\gamma_{sst}$ [mN/m] represents a static surface tension.

12 Claims, 6 Drawing Sheets

RECORDING LIQUID, LIQUID CARTRIDGE, LIQUID DISCHARGE DEVICE, AND LIQUID DISCHARGE METHOD

CROSS REFERENCES TO RELATED APPLICATIONS

The present invention contains subjects related to Japanese Patent Application JP 2005-365234 filed in the Japan Patent Office on Dec. 19, 2005, the entire contents of which being incorporated herein by reference.

BACKGROUND OF THE INVENTION

1. Field of the Invention

The invention relates to a recording liquid to be attached in a droplet state to an object for the purpose of recording on the object, to a liquid cartridge having this recording liquid accommodated therein, and to a liquid discharge device and a liquid discharge method of forming the recording liquid accommodated in this liquid cartridge in a droplet state and discharging it onto an object from a discharge nozzle.

2. Description of the Related Art

Examples of a liquid discharge device include a printer device of an inkjet system of discharging an ink of a recording liquid onto recording paper which is an object, thereby printing images or letters. This printer device of an inkjet system has such an advantage that it is easy to attain low running costs, miniaturization of device and colorization of images or letters.

Examples of the inkjet system of discharging an ink include a diffraction system, a cavity system, a thermojet system, a Bubble Jet (registered trademark) system, a thermal inkjet system, a slit jet system, and a spark jet system. In such an inkjet system, an ink is discharged from a discharge aperture, a so-called nozzle, of an ink discharge head for discharging an ink in a state of a fine droplet and impacted on recording paper, thereby printing images or letters.

In the printer device of an inkjet recording system, there may be the case where the printing is carried out on not only dedicated papers for inkjet recording but also plain papers such as copying paper and writing pad. For that reason, an ink used in the inkjet recording system is required such that even in case where the printing is carried out on not only dedicated papers for inkjet recording but also plain papers, it is possible to achieve printing high-grade images or letters which are especially high in image density, free from bleeding of images or letters, concretely bleeding of boundaries between different colors and unevenness of mixed color, etc. and less in strike through of ink. In order to meet these requirements, examples of the ink which is used for the inkjet recording system include ones described in JP-B-60-23793 (Patent Document 1), JP-A-56-57862 (Patent Document 2), JP-A-6-157959 (Patent Document 3), JP-A-2003-3100 (Patent Document 4), JP-A-2003-253167 (Patent Document 5) and JP-A-8-170041 (Patent Document 6).

Patent Document 1 describes that by using a dialkyl sulfosuccinic acid as a surfactant, dryness is improved. However, according to the ink described in this Patent Document 1, not only a pH region of paper where it is expected to improve the dryness is narrow, but also an improving effect with a lapse of time is deteriorated or a print density is low.

Patent Document 2 describes that by adding a strongly basic substance in an ink, bleeding of an image is suppressed. However, according to the ink described in this Patent Document 2, the effect is useful for only acidic papers but is hardly revealed in plain papers of a neutral paper type.

Patent Documents 3 and 4 describe that by containing a specified amount of each of a wetting agent, a surfactant and 2-ethyl-1,3-hexaediol in an ink, image bleeding, especially image bleeding in a superposed color part is improved. However, according to the inks described in these Patent Documents 3 and 4, though the image bleeding can be improved, strike through of the image is large, the image density is low, and a sufficiently satisfactory high-grade image is hardly obtainable.

Patent Document 5 describes that by containing 2,4-diethyl-1,5-pentanediol in an ink, strike through of the ink is suppressed. However, according to the ink described in Patent Document 5, though image bleeding can be improved, likewise the foregoing Patent Documents 3 and 4, strike through of the image is large, the image density is low, and a sufficiently satisfactory high-grade image is hardly obtainable.

Patent Document 6 describes that by containing propylene glycol monopropyl ether, dryness and image bleeding are improved. However, according to the ink described in Patent Document 6, the effects on dryness and image bleeding are low, and a sufficiently satisfactory high-grade image is hardly obtainable, too.

In the printer device of an inkjet recording system, for example, a printer device capable of performing high-speed printing on recording paper, namely a line type printer device in which a range substantially the same as a width of recording paper is the discharge range of the ink, bleeding of images or letters, strike through of an ink and so on are remarkably caused (see, for example, JP-A-2002-36522 (Patent Document 7)).

In the line type printer device, an ink is discharged for every nozzle line in which nozzles for discharging an ink are arranged in parallel in a range substantially the same as the width of recording paper, thereby performing once printing in one line over the width direction of recording paper. Thus, a discharge cycle of the ink in every nozzle line is extremely short. For that reason, in the line type printer device, when permeation of an ink which is discharged one after the other into the recording paper is slow, bleeding of the ink on images or letters or the like is caused.

Then, in the line type printer device, it is necessary to use an ink having excellent penetration properties into recording paper.

However, in the line type printer device, in the case where printing is carried out on plain paper or the like by using an ink having excellent penetration properties, there may be a possibility that the print density becomes low because the ink excessively permeates in a depth direction, namely a thickness direction of the plain paper.

In the line type printer device, when so-called color printing in which inks having a different color from each other are discharged onto recording paper to achieve printing is carried out, even by using an ink having excellent penetration properties, since the discharge cycle of the ink in every nozzle line is extremely short, before the ink impacted on the recording paper sufficiently permeates into the paper, an ink of a next color is impacted one after the other. For that reason, in the line type printer device, there may be a possibility that bleeding of boundaries between the respective colors or unevenness of mixed color is caused.

SUMMARY OF THE INVENTION

It is desired to provide a recording liquid which is high in print density, is able to prevent bleeding of boundaries and unevenness of mixed color and strike though of an ink from occurring and is able to achieving printing of high-grade images or letters; a liquid cartridge having this recording liquid accommodated therein; and a liquid discharge device and a liquid discharge method capable of achieving high-grade printing by using the recording liquid accommodated in this liquid cartridge.

According to an embodiment of the invention, there is provided a recording liquid to be attached in a droplet state to an object for the purpose of recording on the object, which contains at least one alkylene glycol selected from 1,2-pentanediol, 1,2-hexanediol and 1,3-hexanediol, thereby adjusting a zero second dynamic surface tension thereof at 35 mN/m or more and not more than 40 mN/m and contains a surfactant, thereby adjusting a static surface tension thereof which is satisfied with the following numerical expression (1):

$$(\gamma_{dst0}-3) \leq \gamma_{sst} \leq (\gamma_{dst0}-1) \tag{1}$$

In the foregoing numeral expression (1), $\gamma_{dst0}$ [mN/m] represents a zero second dynamic surface tension; and $\gamma_{sst}$ [mN/m] represents a static surface tension.

According to an embodiment of the invention, there is provided a liquid cartridge having the foregoing recording liquid accommodated therein.

According to an embodiment of the invention, there is provided a liquid discharge device including a device main body; a liquid cartridge having the foregoing recording liquid accommodated therein; and a liquid discharge head connected to the subject liquid cartridge and having a feed passage for feeding the foregoing recording liquid accommodated in the liquid cartridge into a liquid compartment provided with a pressure producing element for pressing the foregoing recording liquid and a discharge nozzle for discharging the foregoing recording liquid.

According to an embodiment of the invention, there is provided a liquid discharge method of discharging the foregoing recording liquid in a droplet state from a discharge nozzle by driving a pressure producing element.

According to the embodiments of the invention, the recording liquid contains at least one alkylene glycol selected from 1,2-pentanediol, 1,2-hexanediol and 1,3-hexanediol, thereby adjusting a zero second dynamic surface tension at 35 mN/m or more and not more than 40 mN/m and contains a surfactant, thereby adjusting a static surface tension such that it is satisfied with the foregoing numerical expression (1). Thus, the recording liquid uniformly permeates into an object, the print density is high, and faults such as bleeding of boundaries and unevenness of mixed color and strike through can be prevented from occurring.

BRIEF DESCRIPTION OF THE DRAWINGS

FIGS. 5A and 5B each shows an ink discharge head, in which

DETAILED DESCRIPTION OF THE PREFERRED EMBODIMENTS

An ink to which an embodiment of the invention is applied, an ink cartridge, an inkjet printer device and a discharge method of an ink by the inkjet printer device will be hereunder described with reference to the accompanying drawings.

Figure 1:
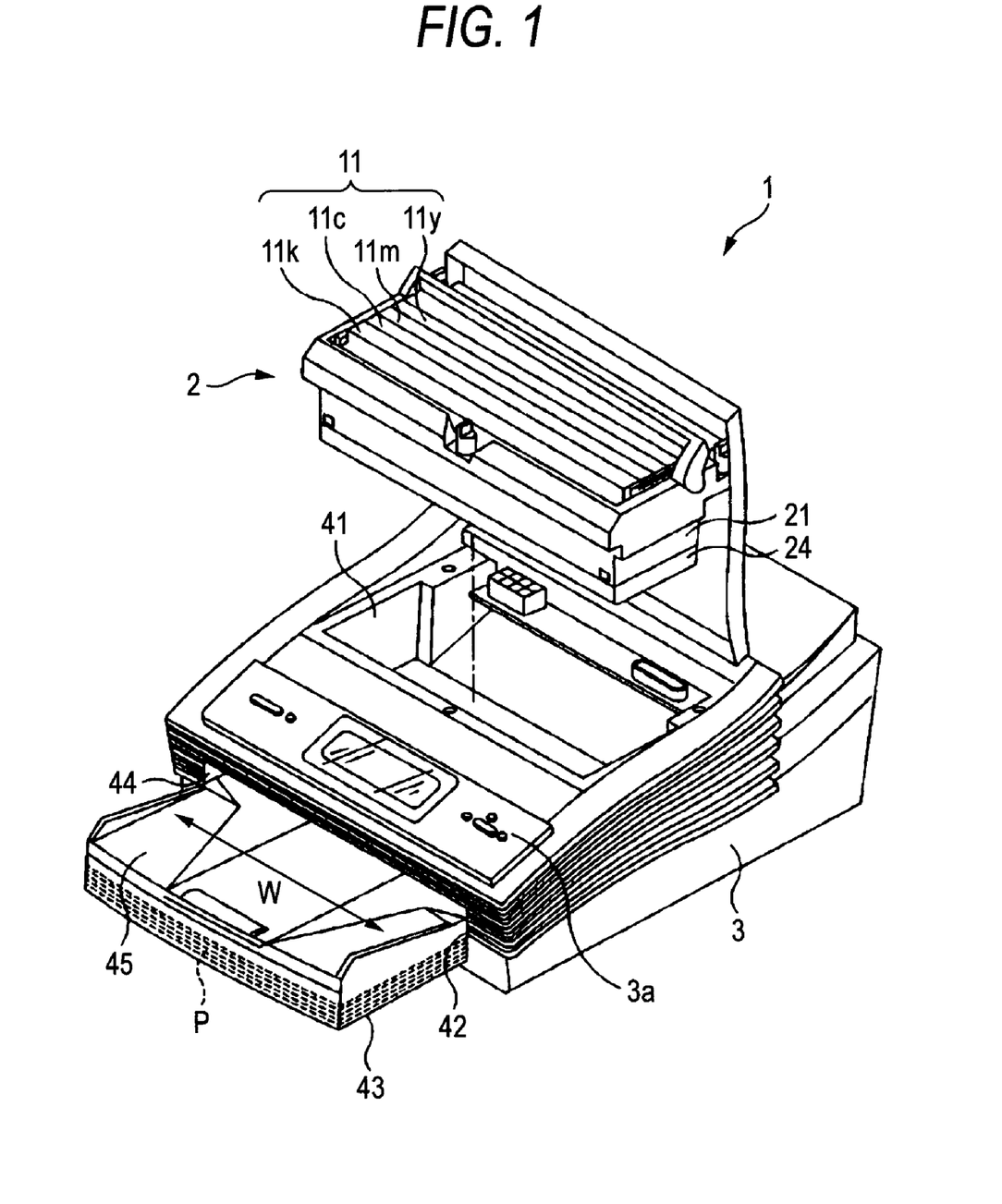
FIG. 1 is an oblique view to show a printer device to which an embodiment of the invention is applied.

An ink to which an embodiment of the invention is applied is, for example, used in an inkjet printer device 1 (hereinafter referred to as "printer device 1") as illustrated in FIG. 1. This printer device 1 is a line type printer device in which nozzles for discharging an ink are provided over a width direction of recording paper P, namely in an arrow W direction in FIG. 1. In this printer device 1, since printing for one line can be carried out over a width direction of the recording paper P by discharging an ink in every nozzle line at which nozzles for discharging an ink are arranged in parallel in a substantial line state within a range substantially the same as the width of the recording paper P, a discharge cycle of an ink in every nozzle line is extremely short. For that reason, an ink of a next color is discharged one after the other. Even when an ink of a next color is discharged one after the other, the ink to which the embodiment of the invention is applied is excellent in penetration properties into the recording paper P and free from bleeding of boundaries and unevenness of mixed color and is able to form images or letters having a high print density. Incidentally, as the recording paper P, not only dedicated papers for inkjet recording which are exclusively used for inkjet printer devices but also plain paper such as copying papers can be used. First of all, an ink to which the embodiment of the invention is applied will be described.

The ink contains a coloring matter, a solvent for dissolving or dispersing this coloring matter therein, and a water-soluble organic solvent for improving the penetration against the recording paper P and a surfactant.

Though dyes, pigments, colored polymer fine particles and so on which are known in the art can be used singly or in admixture as the coloring matter, water-soluble dyes are especially preferably used. Though all of acid dyes, direct dyes, basic dyes, reactive dyes and food dyes are useful as the water-soluble dye, it is preferable that the water-soluble dye is properly selected from the viewpoints of solubility in water, color formation properties, fastness, and so on.

Concretely, examples of yellow water-soluble dyes include C.I. Acid Yellow 17, C.I. Acid Yellow 23, C.I. Acid Yellow 42, C.I. Acid Yellow 44, C.I. Acid Yellow 79, C.I. Acid Yellow 142, C.I. Food Yellow 3, C.I. Food Yellow 4, C.I. Direct Yellow 1, C.I. Direct Yellow 12, C.I. Direct Yellow 24, C.I. Direct Yellow 26, C.I. Direct Yellow 33, C.I. Direct Yellow 44, C.I. Direct Yellow 50, C.I. Direct Yellow 86, C.I. Direct Yellow 120, C.I. Direct Yellow 132, C.I. Direct Yellow 142, C.I. Direct Yellow 144, C.I. Direct Orange 26, C.I. Direct Orange 29, C.I. Direct Orange 62, C.I. Direct Orange 102, C.I. Basic Yellow 1, C.I. Basic Yellow 2, C.I. Basic Yellow 11, C.I. Basic Yellow 13, C.I. Basic Yellow 14, C.I. Basic Yellow 15, C.I. Basic Yellow 19, C.I. Basic Yellow 21, C.I. Basic Yellow 23, C.I. Basic Yellow 24, C.I. Basic Yellow 25, C.I. Basic Yellow 28, C.I. Basic Yellow 29, C.I. Basic Yellow 32, C.I. Basic Yellow 36, C.I. Basic Yellow 40, C.I. Basic Yellow 41, C.I. Basic Yellow 45, C.I. Basic Yellow 49, C.I. Basic Yellow 51, C.I. Basic Yellow 53, C.I. Basic Yellow 63, C.I. Basic Yellow 64, C.I. Basic Yellow 65, C.I. Basic Yellow 67, C.I. Basic Yellow 70, C.I. Basic Yellow 73, C.I. Basic Yellow 77, C.I. Basic Yellow 87, C.I. Basic Yellow 91, C.I. Reactive Yellow 1, C.I. Reactive Yellow 5, C.I. Reactive Yellow 11, C.I. Reactive Yellow 13, C.I. Reactive Yellow 14, C.I. Reactive Yellow 20, C.I. Reactive Yellow 21, C.I. Reactive Yellow 22, C.I. Reactive Yellow 25, C.I. Reactive Yellow 40, C.I. Reactive Yellow 47, C.I. Reactive Yellow 51, C.I. Reactive Yellow 55, C.I. Reactive Yellow 65, and C.I. Reactive Yellow 67.

Examples of magenta water-soluble dyes include C.I. Acid Red 1, C.I. Acid Red 8, C.I. Acid Red 13, C.I. Acid Red 14, C.I. Acid Red 18, C.I. Acid Red 26, C.I. Acid Red 27, C.I. Acid Red 35, C.I. Acid Red 37, C.I. Acid Red 42, C.I. Acid Red 52, C.I. Acid Red 82, C.I. Acid Red 87, C.I. Acid Red 89, C.I. Acid Red 92, C.I. Acid Red 97, C.I. Acid Red 106, C.I. Acid Red 111, C.I. Acid Red 114, C.I. Acid Red 115, C.I. Acid Red 134, C.I. Acid Red 186, C.I. Acid Red 249, C.I. Acid Red 254, C.I. Acid Red 289, C.I. Food Red 7, C.I. Food Red 9, C.I. Food Red 14, C.I. Direct Red 1, C.I. Direct Red 4, C.I. Direct Red 9, C.I. Direct Red 13, C.I. Direct Red 17, C.I. Direct Red 20, C.I. Direct Red 28, C.I. Direct Red 31, C.I. Direct Red 39, C.I. Direct Red 80, C.I. Direct Red 81, C.I. Direct Red 83, C.I. Direct Red 89, C.I. Direct Red 225, C.I. Direct Red 227, C.I. Basic Red 2, C.I. Basic Red 12, C.I. Basic Red 13, C.I. Basic Red 14, C.I. Basic Red 15, C.I. Basic Red 18, C.I. Basic Red 22, C.I. Basic Red 23, C.I. Basic Red 24, C.I. Basic Red 27, C.I. Basic Red 29, C.I. Basic Red 35, C.I. Basic Red 36, C.I. Basic Red 38, C.I. Basic Red 39, C.I. Basic Red 46, C.I. Basic Red 49, C.I. Basic Red 51, C.I. Basic Red 52, C.I. Basic Red 54, C.I. Basic Red 59, C.I. Basic Red 68, C.I. Basic Red 69, C.I. Basic Red 70, C.I. Basic Red 73, C.I. Basic Red 78, C.I. Basic Red 82, C.I. Basic Red 102, C.I. Basic Red 104, C.I. Basic Red 109, C.I. Basic Red 112, C.I. Reactive Red 1, C.I. Reactive Red 14, C.I. Reactive Red 17, C.I. Reactive Red 25, C.I. Reactive Red 26, C.I. Reactive Red 32, C.I. Reactive Red 37, C.I. Reactive Red 44, C.I. Reactive Red 46, C.I. Reactive Red 55, C.I. Reactive Red 60, C.I. Reactive Red 66, C.I. Reactive Red 74, C.I. Reactive Red 79, C.I. Reactive Red 96, and C.I. Reactive Red 97.

Examples of cyan water-soluble dyes include C.I. Acid Blue 9, C.I. Acid Blue 29, C.I. Acid Blue 45, C.I. Acid Blue 92, C.I. Acid Blue 249, C.I. Direct Blue 1, C.I. Direct Blue 2, C.I. Direct Blue 6, C.I. Direct Blue 15, C.I. Direct Blue 22, C.I. Direct Blue 25, C.I. Direct Blue 71, C.I. Direct Blue 76, C.I. Direct Blue 79, C.I. Direct Blue 86, C.I. Direct Blue 87, C.I. Direct Blue 90, C.I. Direct Blue 98, C.I. Direct Blue 163, C.I. Direct Blue 165, C.I. Direct Blue 199, C.I. Direct Blue 202, C.I. Basic Blue 1, C.I. Basic Blue 3, C.I. Basic Blue 5, C.I. Basic Blue 7, C.I. Basic Blue 9, C.I. Basic Blue 21, C.I. Basic Blue 22, C.I. Basic Blue 26, C.I. Basic Blue 35, C.I. Basic Blue 41, C.I. Basic Blue 45, C.I. Basic Blue 47, C.I. Basic Blue 54, C.I. Basic Blue 62, C.I. Basic Blue 65, C.I. Basic Blue 66, C.I. Basic Blue 67, C.I. Basic Blue 69, C.I. Basic Blue 75, C.I. Basic Blue 77, C.I. Basic Blue 78, C.I. Basic Blue 89, C.I. Basic Blue 92, C.I. Basic Blue 93, C.I. Basic Blue 105, C.I. Basic Blue 117, C.I. Basic Blue 120, C.I. Basic Blue 122, C.I. Basic Blue 124, C.I. Basic Blue 129, C.I. Basic Blue 137, C.I. Basic Blue 141, C.I. Basic Blue 147, C.I. Basic Blue 155, C.I. Reactive Blue 1, C.I. Reactive Blue 2, C.I. Reactive Blue 7, C.I. Reactive Blue 14, C.I. Reactive Blue 15, C.I. Reactive Blue 23, C.I. Reactive Blue 32, C.I. Reactive Blue 35, C.I. Reactive Blue 38, C.I. Reactive Blue 41, C.I. Reactive Blue 63, C.I. Reactive Blue 80, and C.I. Reactive Blue 95.

Examples of black water-soluble dyes include C.I. Acid Black 1, C.I. Acid Black 2, C.I. Acid Black 7, C.I. Acid Black 24, C.I. Acid Black 26, C.I. Acid Black 94, C.I. Food Black 1, C.I. Food Black 2, C.I. Direct Black 19, C.I. Direct Black 22, C.I. Direct Black 32, C.I. Direct Black 38, C.I. Direct Black 51, C.I. Direct Black 56, C.I. Direct Black 71, C.I. Direct Black 74, C.I. Direct Black 75, C.I. Direct Black 77, C.I. Direct Black 154, C.I. Direct Black 168, C.I. Direct Black 171, C.I. Basic Black 2, C.I. Basic Black 8, C.I. Reactive Black 3, C.I. Reactive Black 4, C.I. Reactive Black 7, C.I. Reactive Black 11, C.I. Reactive Black 12, and C.I. Reactive Black 17.

The content of the coloring matter is preferably in the range of from 1% by weight to 10% by weight, and more preferably in the range of from 3% by weight to 5% by weight based on the total weight of the ink. This content of the coloring matter is determined while taking into consideration the viscosity, dryness, discharge stability and color formation properties of the ink and the storage stability of a printed material and so on.

As the solvent for dissolving or dispersing the foregoing coloring matter therein, in addition to water, for the purposes of imparting desired physical properties to the ink, improving the solubility or dispersibility of the coloring matter in water and preventing the ink from drying and others, organic solvents which are known in the art can be used jointly.

Concretely, examples of organic solvents which can be used as the solvent include polyhydric alcohols such as diethylene glycol, triethylene glycol, polyethylene glycol, polypropylene glycol, 1,5-pentanediol, glycerol, 1,2,6-hexanetriol, 1,2,4-butanetriol, and petriol; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-pyrrolidone, 1,3-dimethyl imidazolidinone, ε-caprolactam, and γ-butyrolactone; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethyl sulfoxide, sulforane and thiodiethanol.

The content of the foregoing organic solvent is preferably in the range of from 5% by weight to 50% by weight, and more preferably in the range of from 10% by weight to 35% by weight based on the total weight of the ink. Likewise the case of the coloring matter, the content of the organic solvent is determined while taking into consideration the viscosity, dryness and discharge stability of the ink and so on.

In addition to the foregoing solvent for dissolving or dispersing the coloring matter therein, for the purposes of improving the penetration against the recording paper P, enhancing the print density and preventing faults of bleeding of boundaries and unevenness of mixed color and strike through, at least one alkylene glycol selected from 1,2-pentanediol, 1,2-hexanediol and 1,3-hexanediol is added in the ink such that a zero second dynamic surface tension ($\gamma_{dst0}$) thereof is 35 mN/m or more and not more than 40 mN/m.

The addition amount of the alkylene glycol varies depending upon the kind and addition amount of other organic solvent to be used jointly as the solvent of the ink and cannot be unequivocally determined. In general, the addition amount is from 6% by weight to 10% by weight for 1,2-pentanediol, from 2.5% by weight to 4.5% by weight for 1,2-hexanedol and from 5.5% by weight to 10% by weight for 1,3-hexanediol, respectively.

Figure 2:
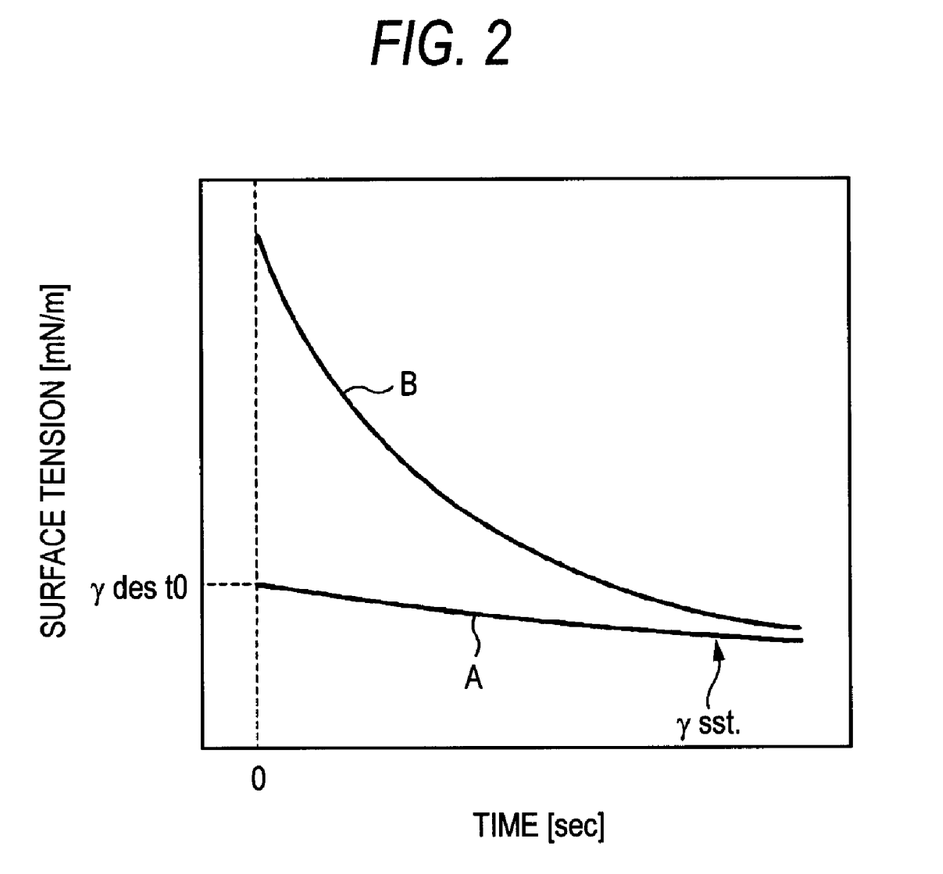
FIG. 2 is a graph to show a surface tension curve of an ink to which an embodiment of the invention is applied.

The 1,2-pentanediol, 1,2-hexanedol and 1,3-hexanediol are able to reduce the zero second dynamic surface tension ($\gamma_{dst0}$) of the ink. Concretely, as shown in FIG. 2, a curve to show a time-varying surface tension of an ink containing 1,2-pentanediol, 1,2-hexanedol or 1,3-hexanediol, to which an embodiment of the invention is applied, is a curve A in FIG. 2; and a curve to show a time-varying surface tension of an ink not containing 1,2-pentanediol, 1,2-hexanedol or 1,3-hexanediol is a curve B in FIG. 2. As shown in FIG. 2, it is understood that the zero second dynamic surface tension ($\gamma_{dst0}$) of the ink containing 1,2-pentanediol, 1,2-hexanedol or 1,3-hexanediol is largely lowered as compared with that of the ink not containing 1,2-pentanediol, 1,2-hexanedol or 1,3-hexanediol.

Here, the zero second dynamic surface tension ($\gamma_{dst0}$) is described. A relaxation function expression of a time-varying dynamic surface tension regarding a liquid containing a surfactant expressed by the following numerical expression (2) is described in, for example, Hua, X. Y., Rosen M. J., *J. Colloid Interface Sci.*, 124, 652 (1988) and Takamitsu Tamura, *Hyomen* (Surface), Vol. 38, No. 10, pages 22 to 44 (2000).

$$\gamma_t = \gamma_m + (\gamma_0 - \gamma_m)/\{1 + (t/t^*)^n\} \quad (2)$$

In the foregoing numerical expression (2), $\gamma_m$ represents a surface tension when a change of surface tension for 30 seconds becomes not more than 1 mN/m; $\gamma_0$ represents a surface tension of the solvent; $t^*$ represents a time at which $\gamma_t$ becomes the middle between $\gamma_0$ and $\gamma_m$; and n represents a constant.

The case where the relaxation numerical expression of a time-varying dynamic surface tension regarding a liquid containing a surfactant expressed by the numerical expression (2) as advocated by Rosen is expanded at t=0 is expressed by the following numerical expression (3).

When the numerical expression (2) is expanded at t=0:

$$\begin{aligned} \gamma_t &= \gamma_m + (\gamma_0 - \gamma_m)/\{1 + (0/t^*)^n\} \quad (3) \\ &= \gamma_m + (\gamma_0 - \gamma_m)/1 \\ &= \gamma_m - \gamma_m + \gamma_0 \\ &= \gamma_0 \end{aligned}$$

As expressed by the numerical expression (3), the zero second dynamic surface tension ($\gamma_{dst0}$) can be determined by measuring a static surface tension of a solvent composed of water and an organic solvent while excluding a coloring matter and an antiseptic, a fungicide, a dispersant, a penetrating agent and a component having a surface activation ability such as a surfactant as described later from the ink. Incidentally, when a dynamic surface tension of the solvent of the ink is continuously measured while varying a rate of forming a bubble, a so-called bubble rate by, for example, a maximum bubble pressure method, concretely when the dynamic surface tension is continuously measured within the range of the bubble rate of from 20 bubbles per second to 0.1 bubbles per second, the dynamic surface tension curve becomes in a substantially transversal straight line, and even when the bubble rate is decreased, the dynamic surface tension curve does not largely drop.

When the zero second dynamic surface tension ($\gamma_{dst0}$) of the ink is less than 35 mN/m, the ink impacted on the recording paper P excessively permeates in a width direction of the recording paper P, namely in a thickness direction of the recording paper P. As a result, there may be possibilities that the print density decreases and that the ink permeates out from the back side of the recording paper P. On the other hand, when the zero second dynamic surface tension ($\gamma_{dst0}$) of the ink exceeds 40 mN/m, the permeation in a thickness direction of the recording paper P becomes slow. As a result, there may be a possibility that feathering, bleeding of boundaries, or the like is caused. In particular, when the zero second dynamic surface tension ($\gamma_{dst0}$) of the ink is 45 mN/m or more, the feather or bleeding of boundaries becomes remarkable.

Accordingly, by containing at least one alkylene glycol selected from 1,2-pentanediol, 1,2-hexanediol and 1,3-hexanediol in the ink, thereby adjusting the zero second dynamic surface tension ($\gamma_{dst0}$) at 35 mN/m or more and not more than 40 mN/m, a degree of permeation of the ink in a width direction and a planar direction becomes uniform without causing excessive permeation or slow permeation in a thickness direction of the recording paper P; and the generation of a lowering of the print density, strike through, bleeding of boundaries and unevenness of mixed color can be prevented from occurring.

Incidentally, in order to adjust the zero second dynamic surface tension ($\gamma_{dst0}$) at 35 mN/m or more and not more than 40 mN/m, compounds other than the foregoing alkylene glycol, for example, alkylene monoalcohols or alkylene glycols having from 7 to 10 carbon atoms could be used. However, in comparison with the foregoing 1,2-pentanediol, 1,2-hexanediol or 1,3-hexanediol having 5 or 6 carbon atoms, in general, these alkylene monoalcohols or alkylene glycols having from 7 to 10 carbon atoms are excellent in an ability to reduce a surface tension, excessively permeate into the recording paper P and are excessively high in hydrophobicity. For those reasons, the print density is low, or the strike through of the image becomes large. Thus, these alkylene monoalcohols or alkylene glycols having from 7 to 10 carbon atoms are not preferable. As the case may be, they corrode a head cartridge 2 as described later, which is manufactured by bonding, welding or fusing a number of members, an ink cartridge 11 as described later in which an ink is accommodated, a passage for connecting the head cartridge 2 to the ink cartridge 11, and the like, thereby causing leakage of the ink; and the ink gradually penetrates into plastic or plastic/metal hybrid raw materials constituting the head cartridge 2 or ink cartridge 11, thereby causing faults such as a lowering of adhesive strength between the members and deformation due to swelling. Therefore, these alkylene monoalcohols or alkylene glycols having from 7 to 10 carbon atoms are not preferable.

The foregoing 1,2-pentanediol, 1,2-hexanediol and 1,3-hexanediol are good in a balance between hydrophilicity and hydrophobicity, and taking into consideration the penetration properties into the recording paper P and influences against the head cartridge 2, the ink cartridge 11 and the passage, it is preferable that such a compound is contained in the ink.

As an ink containing an alkylene glycol therein, there is enumerated an inkjet ink containing from 0.1 to 10% by weight of a water-soluble dye, from 70 to 95% by weight of water and from 4 to 29% by weight of a linear alkylene glycol having 6 carbon atoms as described in JP-A-3-255177. The linear alkylene glycol having 6 carbon atoms described in this patent document is 1,6-hexanediol or 1,5-hexanediol. In the 1,6-hexanediol or 1,5-hexanediol, it is difficult to optimize the zero second dynamic surface tension ($\gamma_{dst0}$). Accordingly, it cannot be always said that any isomer of the linear alkylene glycol having 6 carbon atoms is able to decrease the zero second dynamic surface tension ($\gamma_{dst0}$), thereby optimizing it.

JP-A-7-157698 proposes an ink containing from 0.1% by weight to 12.5% by weight of a 1,2-alkyl diol having from 5 to 9 carbon atoms. However, this patent document neither describes a thought for optimizing the zero second dynamic surface tension ($\gamma_{dst0}$) of the ink by a 1,2-alkyl diol having from 5 to 9 carbon atoms nor joint use of a surfactant for imparting an optimum static surface tension to the ink.

In order that the ink may have a static surface tension ($\gamma_{sst}$) which is satisfied with the following numerical expression (1), the ink contains a surfactant in addition to the foregoing alkylene glycol.

$$(\gamma_{dst0}-3) \leq \gamma_{sst} \leq (\gamma_{dst0}-1) \quad (1)$$

In the foregoing numeral expression (1), $\gamma_{dst0}$ [mN/m] represents a zero second dynamic surface tension; and $\gamma_{sst}$ [mN/m] represents a static surface tension.

What the static surface tension ($\gamma_{sst}$) of the ink is satisfied with the numerical expression (1) means that a difference between the zero second dynamic surface tension ($\gamma_{dst0}$) and the static surface tension ($\gamma_{sst}$) of the ink is small. As is also clear from the surface tension curve A of the ink to which the embodiment of the invention is applied as shown in FIG. 2, a difference between the zero second dynamic surface tension ($\gamma_{dst0}$) and the static surface tension ($\gamma_{sst}$) is small.

When the static surface tension ($\gamma_{sst}$) of the ink is satisfied with the numerical expression (1), the penetration properties of the ink into the recording paper P after impacting on the recording paper P for a while, namely the penetration properties with a lapse of time do not become excessively high; strike through can be prevented from occurring; the wettability against a surface of a surface or internal sizing agent constituting the recording paper P becomes good; and shade spots can be prevented from occurring.

When a value of the static surface tension ($\gamma_{sst}$) of the ink is less than {[zero second dynamic surface tension value ($\gamma_{dst0}$)]−3 (mN/m)}, the penetration properties of the ink into the recording paper P after impacting on the recording paper P for a while, namely the penetration properties with a lapse of time are excessively high, and strike through of the image becomes serious. Therefore, such is not preferable.

On the other hand, when a value of the static surface tension ($\gamma_{sst}$) of the ink is larger than {[zero second dynamic surface tension value ($\gamma_{dst0}$)]−1 (mN/m)}, the wettability against a surface of a surface or internal sizing agent constituting the recording paper P may possibly be insufficient, resulting in shade spots, namely solid spots. Therefore, such is not preferable. There is a difference between wet spreading of the 1,2-pentanediol, 1,2-hexanediol or 1,3-hexanediol in the ink onto cellulose fiber surfaces, gaps formed by intertwining among cellulose fibers, inorganic filler surfaces, and so on and wet spreading on a surface of a surface or internal sizing agent exhibiting hydrophobicity, and the solid spots are caused due to a time difference of this wet spreading. By containing a surfactant in the ink, thereby adjusting a static surface tension ($\gamma_{sst}$) at not more than {[zero second dynamic surface tension value ($\gamma_{dst0}$)]−1 (mN/m)}, the wettability of the ink against a surface of the surface or internal sizing agent becomes good. Thus, a time difference between wet spreading of the 1,2-pentanediol, 1,2-hexanediol or 1,3-hexanediol in the ink onto cellulose fiber surfaces, gaps formed by intertwining among cellulose fibers, inorganic filler surfaces, and so on and wet spreading on a surface of a surface or internal sizing agent exhibiting hydrophobicity can be minimized, and the shade spots which are likely formed in a solid printed part can be controlled. For that reason, in the case of the addition amount of the surfactant at which a value of the static surface tension ($\gamma_{sst}$) of the ink is larger than {[zero second dynamic surface tension value ($\gamma_{dst0}$)]−1 (mN/m)}, the wettability against the surface of the surface or internal sizing agent forming the recording paper P is insufficient so that a time difference between wet spreading onto cellulose fiber surfaces, gaps formed by intertwining among cellulose fibers, inorganic filler surfaces, and so on and wet spreading on a surface of a surface or internal sizing agent cannot be minimized. Thus, it is difficult to satisfactorily control solid spots.

Examples of the surfactant which adjusts the static surface tension ($\gamma_{sst}$) of the ink include ethylene oxide adducts of 2-ethylhexyl monoalcohol and so on. The surfactant is preferably an ethylene oxide adduct of an alkylene glycol having 8 or 9 carbon atoms. Such a compound is good in affinity especially with a surface or internal sizing agent contained in the recording paper P and is able to improve the foregoing solid spots with good efficiency. While we are unable to unequivocally say because the addition molar number of ethylene oxide is influenced by the carbon atom number, when the carbon atom number is not more than 7, the surface activation ability is deteriorated. On the other hand, when the carbon atom number exceeds 9, the hydrophobicity is too high so that the compound is not easy for use in the adjustment of the ink. By increasing the addition molar number of ethylene oxide, it is possible to negate the hydrophobicity. However, if so, the molecular weight becomes high and causes an increase of viscosity of the ink. Thus, such is not preferable.

Examples of the ethylene oxide adduct of an alkylene glycol having 8 or 9 carbon atoms include ethylene oxide adducts of, for example, 2-ethyl-1,3-hexanediol, 2-eth-yl-2-n-propyl-1,3-propanediol, 2,4-diethyl-1,5-pentanediol, 2-methyl-2-n-pentane-1,3-propanediol, and 2-ethylhexyl monoalcohol. While we are unable to unequivocally say because the addition molar number of ethylene oxide is influenced by the carbon atom number and the branched state of an alkyl, in general, the average total addition molar number is from 2 to 10 moles.

Of such ethylene oxide adducts of an alkylene glycol having 8 or 9 carbon atoms, especially when an ethylene oxide adduct of 2-ethyl-2-n-butyl-1,3-propanediol represented by the following chemical formula (1) is used, it is possible to achieve printing with high grade much more.

(1)

In the foregoing chemical formula (1), m and n each represents an integer of from 0 to 10 and are satisfied with the relation of $[1 \leq (m+n) \leq 10]$.

While we are unable to unequivocally say because the addition amount of the surfactant varies depending upon the solvent composition of the ink and the kind of the surfactant, in general, the addition amount of the surfactant is preferably in the range of from 0.1% by weight to 3% by weight, and more preferably in the range of from 0.2% by weight to 2% by weight based on the total weight of the ink. In the ink, by making the addition amount of the surfactant fall within this range, the static surface tension ($\gamma_{sst}$) is satisfied with the numerical expression (1). When the addition amount of the surfactant is less than 0.01% by weight, it is difficult to obtain the addition effect brought due to the addition of the surfactant. On the other hand, when the addition amount of the surfactant exceeds 5% by weight, the viscosity of the ink may possibly become excessively high, and the discharge stability is impaired, thereby possibly making the penetration properties into the recording paper P slow. Therefore, such is not preferable.

In the ink, the static surface tension ($\gamma_{sst}$) is adjusted at 33 mN/m or more and not more than 39 mN/m. In the case where the static surface tension ($\gamma_{sst}$) is less than 33 mN/m, when the ink is impacted on the recording paper P, the ink excessively permeates in a width direction of the recording paper P, namely in a thickness direction of the recording paper P. As a result, there may be possibilities that the print density decreases and that the ink permeates out from the back side of the recording paper P. On the other hand, when the static surface tension ($\gamma_{sst}$) of the ink exceeds 39 mN/m, the permeation in a thickness direction of the recording paper P becomes slow. As a result, there may be a possibility that feathering or the like is caused. Accordingly, by adjusting the static surface tension ($\gamma_{sst}$) at 33 mN/m or more and not more than 39 mN/m, when the ink is impacted on the recording paper P, it is possible to prevent a lowering of the print density, strike through, feathering, and so on from occurring without causing excessive permeation or slow permeation in a thickness direction of the recording paper P. The surface tension can be measured by a Wilhelmy (Plate) method or the like.

In the ink, surfactants which are known in the art can be added so far as they do not hinder the action and effect of the foregoing water-soluble organic solvent and surfactant and so on. Concretely, examples of surfactants which are known in the art include special phenol type nonionic surfactants such as polycyclic phenol ethoxylate; ester type nonionic surfactants such as ethylene oxide adducts of glyceride, polyethylene glycol oleate, polyoxyalkylene taloate, sorbitan lauryl ester, sorbitan oleyl ester, and polyoxyethylene sorbitan oleyl ester; amide type nonionic surfactants such as coconut oil fatty acid diethanol amide and polyoxyethylene coconut oil fatty acid diethanol amide; anionic surfactants such as acetylene glycol and ethylene oxide adducts thereof, alcohol sulfate sodium salts, higher alcohol sulfate sodium salts, polyoxyethylene alkylphenyl ether sulfuric acid ester ammonium salts, and sodium alkylbenzenesulfonates; cationic surfactants such as mono-long chain alkyl cations, di-long chain alkyl cations, and alkylamine oxides; and amphoteric surfactants such as laurylamidopropyl acetic acid betaine and laurylaminoacetic acid betaine. These surfactants which are known in the art can be used singly or in admixture.

In the ink, for example, a viscosity adjuster, a pH adjuster, an antiseptic, an antirust agent, a fungicide, and the like can also be added. Concretely, examples of the viscosity adjuster and the pH adjuster include proteins such as gelatin and casein, natural rubbers such as gum arabic, cellulose derivatives such as methyl cellulose, carboxymethyl cellulose, and hydroxymethyl cellulose, natural polymers such as lignin sulfonic acid salts and shellac, polyacrylic acid salts, styrene-acrylic acid copolymer salts, polyvinyl alcohol, and polyvinylpyrrolidone. These can be used singly or in admixture. Examples of the antiseptic, the antirust agent and the fungicide include benzoic acid, dichlorophene, hexachlorophene, sorbic acid, p-hydroxybenzoic acid esters, and ethylenediaminetetraacetic acid (EDTA). These can be used singly or in admixture.

The ink can be prepared by mixing the foregoing coloring matter, the solvent such as 1,2-pentanediol, 1,2-hexanediol and 1,3-hexanediol, the surfactant such as an ethylene oxide adduct of an alkylene glycol, and so on in a prescribed mixing ratio and stirring, dispersing and filtering the mixture by a screw or the like at the ordinary temperature or while heating at approximately 40° C. to 80° C.

In the ink having the foregoing constitution, by containing at least one alkylene glycol selected from 1,2-pentanediol, 1,2-hexanediol and 1,3-hexanediol, the zero second dynamic surface tension ($\gamma_{dst0}$) is regulated at 35 mN/m or more and not more than 40 mN/m; by containing a surfactant, the static surface tension ($\gamma_{sst}$) is satisfied with the foregoing numerical expression (1). Thus, since excessive permeation or slow permeation in a thickness direction of the recording paper P is not caused, the ink uniformly penetrates into the recording paper P, the print density is high, and bleeding of boundaries and unevenness of mixed color and strike through can be prevented from occurring.

In the ink having the foregoing constitution, it uniformly penetrates into not only dedicated papers for inkjet recording but also plain papers; the print density is high; and bleeding of boundaries and unevenness of mixed color and strike through can be prevented from occurring; and a high-grade image can be formed.

The inkjet printer device 1 using this ink (hereinafter referred to as "printer device") will be concretely described. As illustrated in FIG. 1, the printer device 1 is provided with an inkjet printer head cartridge (hereinafter referred to as "head cartridge") 2 for discharging the foregoing ink onto an object, for example, the recording paper P and a device main body 3 in which this head cartridge 2 is installed. This printer device 1 is a so-called line type printer device in which nozzles are arranged in parallel in one or more lines in a substantial line state in a width direction of the recording paper P, namely an arrow W direction in FIG. 1. In the printer device 1, the head cartridge 2 is detachable against the device main body 3.

Figure 3:
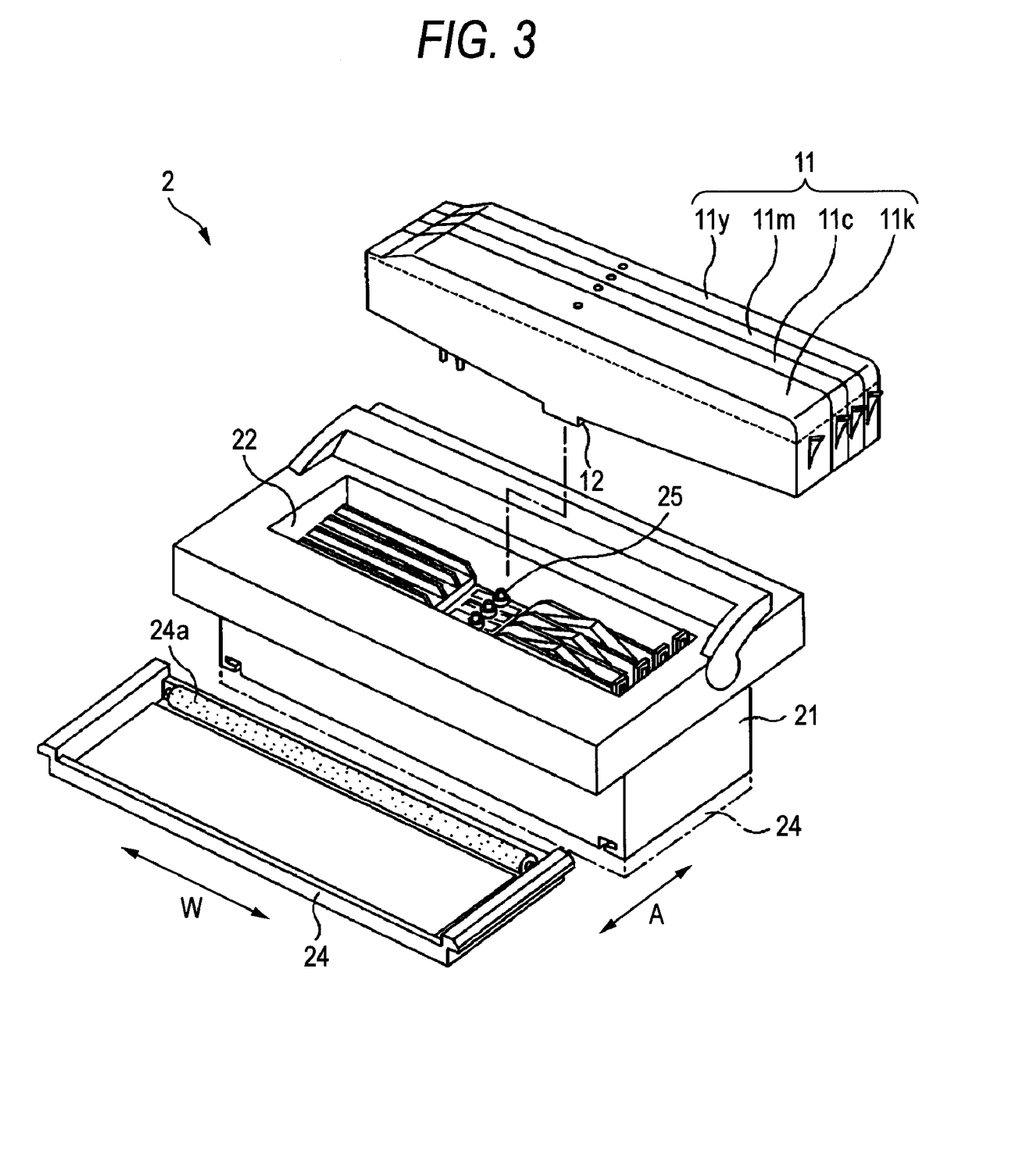
FIG. 3 is an oblique view to show a head cartridge provided in the printer device.
Figure 4:
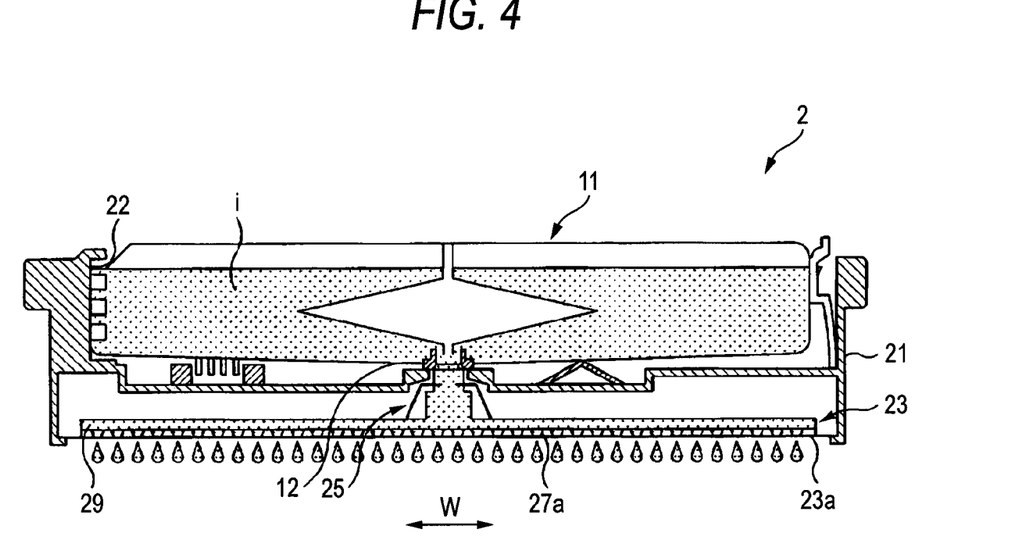
FIG. 4 is a sectional view to show this head cartridge.

First of all, the head cartridge 2 configuring the printer device 1 will be described. The head cartridge 2 discharges the foregoing ink using, for example, a heating resistor of an electro-thermal conversion system as a pressure producing element and impacts it on a principal face of the recording paper P. As illustrated in FIGS. 3 and 4, an ink cartridge 11 having an ink i accommodated therein is installed in the head cartridge 2. The ink cartridge 11 is provided with an ink cartridge 11y for a yellow color, an ink cartridge 11m for a magenta ink, an ink cartridge 11c for a cyan ink and an ink cartridge 11k for a black ink for every color. The ink cartridge 11 is formed in a substantially rectangular shape having a dimension substantially the same as that in the width direction of the recording paper P. As illustrated in FIGS. 3 and 4, the ink cartridge 11 is provided with an ink feed part 12 for feeding an ink into a cartridge main body 21 of the head cartridge 2.

The ink feed part 12 is provided in a substantially central part in the lower side of the ink accommodating part 12. This ink feed part 12 is a nozzle having a substantially projected shape and communicated with the ink accommodating part 12; and a tip of this nozzle is fitted in a connection part 25 of the head cartridge 2 as described later, thereby connecting the ink cartridge 11 to the cartridge main body 21 of the head cartridge 2. The ink feed part 12 is provided with a valve mechanism therein, and the feed of an ink into the cartridge main body 21 is adjusted by this valve mechanism.

As illustrated in FIGS. 3 and 4, the head cartridge 2 having the ink cartridge 11 installed therein has the cartridge main body 21. The cartridge main body 21 is provided with an installation part 22 in which the ink cartridge 11 is installed, an ink discharge head 23 for discharging an ink, and a head cap 24 for protecting this ink discharge head 23.

The installation part 22 is provided with the connection part 25 connected to the ink feed part 12 of the ink cartridge 11 installed in the installation part 22 in a substantial center in a longitudinal direction thereof. This connection part 25 becomes an ink feed passage for feeding an ink into the ink discharge head 23 for discharging an ink as provided on the bottom face of the cartridge main body 21 from the ink feed part 12 of the ink cartridge 11 installed in the installation part 22. In the connection part 25, the feed of an ink from the ink cartridge 11 into the ink discharge head 23 is adjusted by a valve mechanism.

The ink discharge head 23 into which an ink is fed from the connection part 25 is arranged on the bottom face of the cartridge main body 21. In the ink discharge head 23, nozzles 27a as described later which are an ink discharge nozzle for discharging an ink fed from the connection part 25 are arranged in a substantial line state for every color in a width direction of the recording paper P, namely an arrow W direction in FIG. 3. In discharging an ink, the ink discharge head 23 discharges the ink into every nozzle line without moving in the width direction of the recording paper P.

Figure 5A:
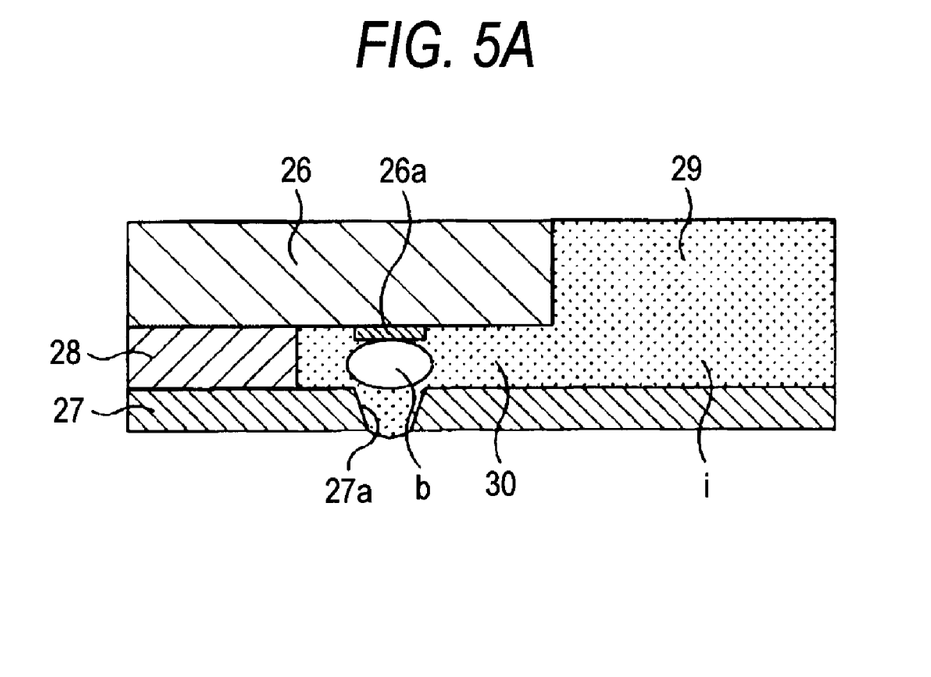
FIG. 5A is a sectional view to schematically show a state that an air bubble is formed in a heating resistor.
Figure 5B:
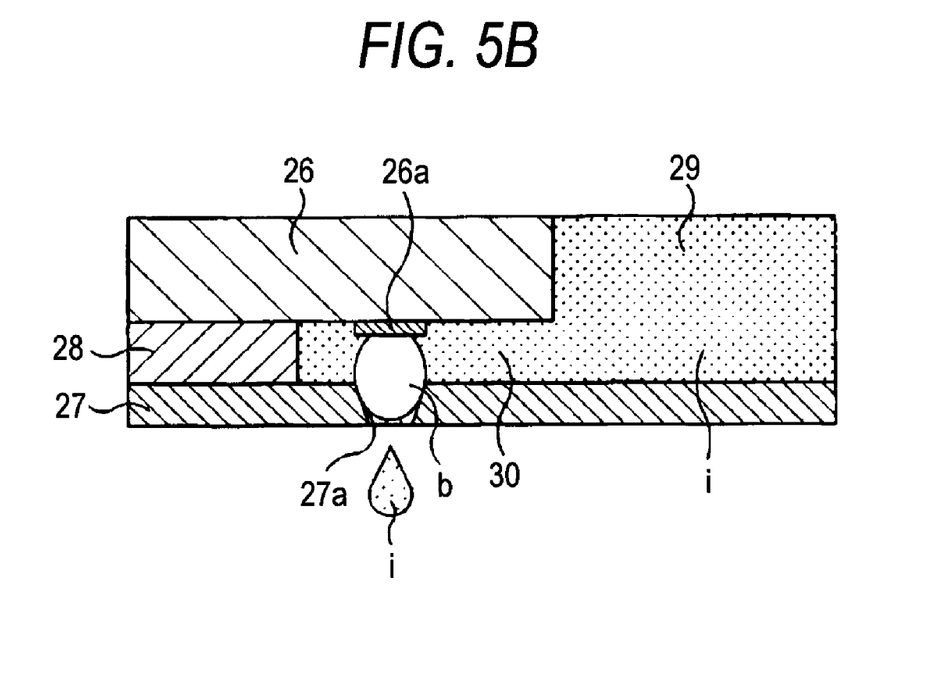
FIG. 5B is a sectional view to schematically show a state that an ink droplet is discharged from a nozzle.

As illustrated in FIGS. 5A and 5B, in the ink discharge head 23, a circuit board 26 provided with a heating resistor 26a of en electro-thermal conversion type and a nozzle 27a are formed; and an ink passage 29 for feeding an ink fed from the connection part 25 into each nozzle 27a is formed by a nozzle sheet 27 formed of a metal thin film such as nickel plating and a film 28 provided between the circuit board 26 and the nozzle sheet 27. This ink passage 29 is formed long in a direction at which the nozzles 27a are arranged in parallel, namely in the arrow W direction in FIG. 3. In the ink discharge head 23, an ink liquid compartment 30 which is surrounded by the circuit board 26, the nozzle sheet 27 and the film 28 and in which the heating resistor 26a pressurizes the ink is formed.

In the ink discharge head 23, the ink flows into the ink passage 29 from the ink cartridge 11 via the connection part 25 of the head cartridge 2, flows into the ink compartment 30 from the ink passage 29 and is fed into each nozzle 27a.

This ink discharge head 23 is formed by forming the film 28 made of, for example, an exposure hardening type film resist on the circuit substrate 26 and sticking the nozzle sheet 27 formed of a metal thin film as manufactured by a separate step on this film 28. In the ink discharge head 23, since 1,2-pentanediol, 1,2-hexanediol or 1,3-hexanediol is used for the purpose of adjusting the zero second dynamic surface tension ($\gamma_{dst0}$) of the ink as described previously, different from the case of using other alkylene monoalcohol or alkylene glycol having from 7 to 10 carbon atoms, the ink does not penetrate into the film 28, and a lowering of an adhesive strength between the film 28 and the circuit board 26 or nozzle sheet 27 or deformation can be prevented from occurring.

The ink discharge head 23 having the foregoing con-figuration feeds a pulse current into the heating resistor 26a selected on a basis of printing data for a period of time of, for example, from approximately 1 to 3 microseconds. Thus, in the ink discharge head 23, the heating resistor 26a is driven and rapidly heated. In the ink discharge head 23, when the heating resistor 26a is heated, as illustrated in FIG. 5A, an air bubble b is formed in an ink coming into contact with the heating resistor 26a. Then, in the ink discharge head 23, as illustrated in FIG. 5B, the air bubble b pressurizes the ink while expanding, and the ink thus pushed away becomes in a droplet state and is discharged from the nozzle 27a. After discharging the ink droplet, the ink discharge head 23 is again returned to an original state before discharging by feeding an ink into the ink liquid compartment 30 through the ink passage 29. The ink discharge head 23 repeats the foregoing operations on a basis of printing data and discharges the ink onto the recording paper P.

Figure 6:
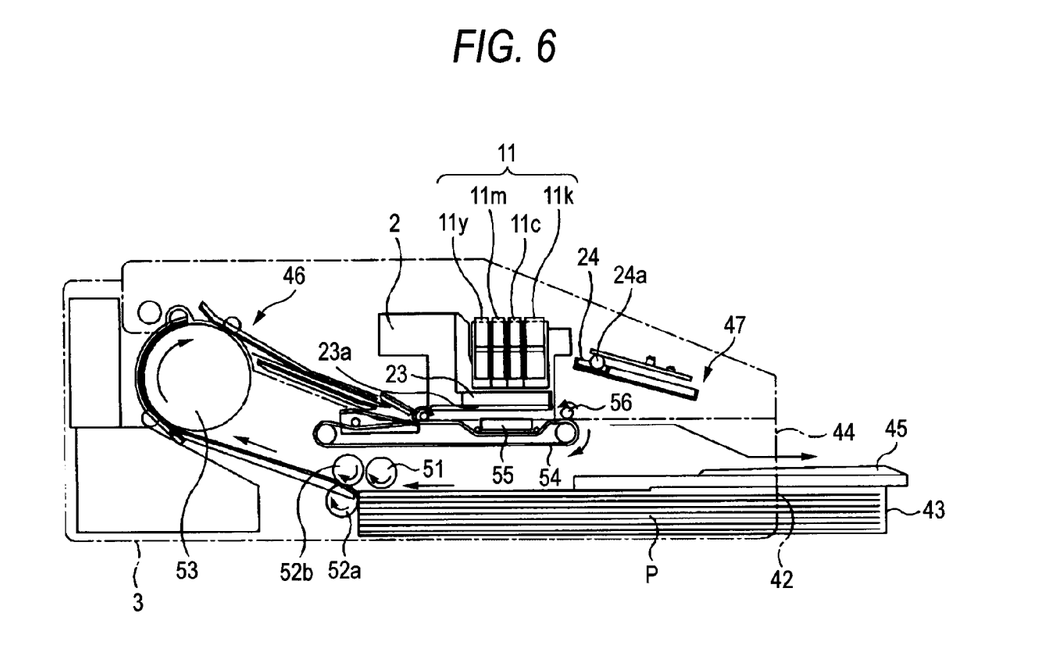
FIG. 6 is a perspective side view to show a part of this printer device.

As illustrated in FIG. 2, the head cap 24 for protecting a discharge face 23a of the ink discharge head 23 for discharging an ink does not discharge an ink and during a period of time when printing is not carried out, closes the discharge face 23a of the ink discharge head 23, thereby protecting the nozzle 27a from drying or the like. As illustrated in FIGS. 3 and 6, in carrying out printing, the head cap 24 moves from the bottom face of the head cartridge 2 and exposes the discharge face 23a of the ink discharge head 23 to the outside.

This head cap 24 is provided with a cleaning roller 24a for wiping out an excessive ink attached to the discharge face 23a. In the head cap 24, in opening the discharge face 23a, by cleaning the discharge face 23a by the cleaning roller 24a, the excessive ink attached to the discharge face 23a is removed, whereby the ink is properly discharged.

As illustrated in FIG. 1, in the device main body 3 in which the head cartridge 2 is installed, the head cartridge 2 is installed in a head cartridge installation part 41. The device main body 3 is mounted with a paper feed tray 43 in which recording papers P prior to printing are stacked and accommodated in a paper feed port 42 provided in a lower side of a front face thereof and mounted with a paper discharge tray 45 for accommodating the recording papers P after printing in a paper discharge port 44 provided in an upper side of the front face.

As illustrated in FIG. 6, the device main body 3 is provided with a paper feed and discharge mechanism 46 for conveying the recording paper P and a cap opening and closing mechanism 47 for opening and closing the head cap 24 provided on the discharge face 23a of the head cartridge 23.

According to the foregoing configuration, the printer device 1 is controlled by a control part provided in a control circuit for controlling the feed of a current to be fed into the feed and discharge mechanism 46, the head cap opening and closing mechanism 47 and the ink discharge head 23 on a basis of printing data inputted from an externally provided information processor.

Concretely, in the printer device 1, first of all, when the control part is ordered to start printing by the operation of an operation button 3a provided in the device main body 3, the paper feed and discharge mechanism 46 and the head cap opening and closing mechanism 47 are driven by a control signal from the control part, whereby the printer device 1 becomes in a state that printing is possible as illustrated in FIG. 6.

In the printer device 1, the head cap 24 is moved from the bottom face of the head cartridge 2 into the front face side provided with the paper feed tray 43 and the paper discharge tray 45 by driving the head cap opening and closing mechanism 47. Thus, in the printer device 1, the nozzle 27a provided on the discharge face 23a of the ink discharge head 23 is exposed to the outside, thereby enabling it to discharge the ink.

In the printer device 1, the recording paper P is drawn out from the paper feed tray 43 by a paper feed roller 51 by driving the paper feed and discharge mechanism 46, and only one sheet of the recording paper P is drawn out by one pair of separation rollers 52a, 52b rotating in an opposite direction to each other. Then, in the printer device 1, the recording paper P thus drawn out is conveyed onto a reverse roller 53 provided in the back side of the device main body 3 and reversed towards the front face side of the device main body 3 by the reverse roller 53 and is then conveyed onto a conveyance belt 54 provided in a position opposing to the discharge face 23a of the ink discharge head 23. In the printer device 1, by supporting the recording paper P conveyed by the conveyance belt 54 in a prescribed position by a platen plate 55, the recording paper P is made opposite to the discharge face 23a.

Next, in the printer device 1, a drive current is fed into the plural heating resistors 26a provided in the ink discharge head 23 on a basis of a control signal of printing data, thereby heating the heating resistors 26a. In the printer device 1, as illustrated in FIGS. 5A and 5B, by heating the heating resistors 26a, the foregoing ink is discharged in a droplet state onto the conveyed recording paper P in a position opposing to the discharge face 23a in every line; and printing of one line over the width direction of the recording paper P is subsequently carried out in a length direction of the recording paper P, thereby printing images, letters or the like.

Then, in the printer device 1, when the ink droplet is discharged from the nozzle 27a, an ink of the same amount as the discharged amount of the ink is fed into the ink discharge head 23 from the ink cartridge 11 via the valve mechanism 34 of the connection part 25.

Next, in the printer device 1, the recording paper P in which printing of images, letters or the like has been finished is sent out by the conveyance belt 54 rotating in a direction of the paper discharge port 44 and a paper discharge roller 56 opposing to the conveyance belt 54 and provided in a side of the paper discharge port 44 than the discharge face 23a, whereby the recording paper P after printing is discharged into the paper discharge tray 45. In the printer device 1, printing is carried out on the recording paper P in this manner.

In the light of the above, in the printer device 1, an ink of every color is successively discharged in every nozzle line at which the nozzles 27a are provided for every color and arranged in parallel in a substantial line state in a width direction of the recording paper P, thereby performing once printing in one line over the width direction of recording paper P. Thus, a discharge interval of the ink in every nozzle line is short.

In this printer device 1, the ink contains at least one alkylene glycol selected from 1,2-pentanediol, 1,2-hexane-diol and 1,3-hexanediol, thereby adjusting the zero second dynamic surface tension ($\gamma_{dst0}$) at 35 mN/m or more and not more than 40 mN/m and contains a surfactant, thereby adjusting the static surface tension ($\gamma_{sst}$) such that it is satisfied with the foregoing numerical expression (1). Since excessive permeation or slow permeation in a thickness direction of the recording paper P is not caused, the ink uniformly penetrates into the recording paper P. Thus, in the printer device 1, the discharge interval of the ink in each nozzle line is short, and even when an ink of a next color is discharged one after the other, the ink uniformly penetrates into the recording paper P. As a result, high-grade images or letters which are high in print density and free from bleeding of boundaries and unevenness of mixed color and strike through can be printed.

In the printer device 1, by adjusting the zero second dynamic surface tension ($\gamma_{dst0}$) and the static surface tension ($\gamma_{sst}$) of the ink as described previously, since the ink uniformly penetrates into not only dedicated papers for inkjet recording but also plain papers, high-grade images which are high in print density and free from bleeding of boundaries and unevenness of mixed color and strike through can be formed.

The ink can be used in not only the foregoing line type printer device 1 but also a serial printer device for carrying out printing of one line by moving an ink discharge head in a width direction of the recording paper P. Even in the case where the ink to which the embodiment of the invention is applied is used in a serial printer device, high-grade images or letters which are high in print density and free from bleeding of boundaries and unevenness of mixed color and strike through can be printed.

It should not be construed that the application of the foregoing ink is limited to an inkjet printer device as the printer device 1, but the ink can be widely applied in other liquid discharge devices for discharging a liquid. For example, the ink can be applied to facsimiles and copiers and is able to similarly form high-grade images or letters.

In the foregoing printer device 1, while the ink discharge 23 for discharging an ink upon heating by the single heating resistor 26a has been described as one embodiment, it should not be construed that the embodiment of the invention is limited to such a structure. The printer device 1 may be provided with plural pressure producing elements.

Though the printer device 1 employs an electro-thermal conversion system for discharging an ink from the nozzle 42a upon heating by the single heating resistor 26a, it should not be construed that the invention is limited to this system. For example, an electromechanical conversion system for electromechanically discharging an ink from a nozzle by using an electromechanical conversion element such as a piezoelectric element, for example, a piezo element may be employed.

EXAMPLES

Examples and Comparative Examples in which an ink according to the embodiment of the invention was actually prepared will be hereunder described.

(Sample 1)

In Sample 1, first of all, a yellow ink was prepared in the following manner. That is, in preparing a yellow ink, 3 parts by weight of Acid Yellow 142 as a coloring matter; 77.5 parts by weight of water as a solvent; 8 parts by weight of glycerin, 8 parts by weight of 2-pyrrolidone and 3 parts by weight of 1,2-hexanediol as other solvents; and 0.5 parts by weight of an ethylene oxide adduct of 2-ethylhexyl monoalcohol (addition molar number of ethylene oxide: 4) as a surfactant were mixed and filtered through a membrane filter (a trade name: Millex-0.22, manufactured by Millipore Corporation) having a pore size of 0.22 μm, thereby preparing a yellow ink.

The resulting yellow ink contains 3% by weight of 1,2-hexanediol and also contains 0.5% by weight of an ethylene oxide adduct of 2-ethylhexyl monoalcohol (addition molar number of ethylene oxide: 4).

Next, a black ink was prepared in the following manner. That is, in preparing a black ink, 4 parts by weight of Food Black 2 as a coloring matter; 73.5 parts by weight of water as a solvent; 8 parts by weight of glycerin, 8 parts by weight of 2-pyrrolidone and 6 parts by weight of 1,2-pentanediol as other solvents; and 0.5 parts by weight of an ethylene oxide adduct of 2-ethylhexyl monoalcohol (addition molar number of ethylene oxide: 4) as a surfactant were mixed and filtered through a membrane filter (a trade name: Millex-0.22, manufactured by Millipore Corporation) having a pore size of 0.22 μm, thereby preparing a black ink.

The resulting black ink contains 6% by weight of 1,2-pentanediol and also contains 0.5% by weight of an ethylene oxide adduct of 2-ethylhexyl monoalcohol (addition molar number of ethylene oxide: 4).

(Samples 2 to 12)

In Samples 2 to 12, yellow inks and black inks were respectively prepared in the same manner as in Sample 1, except that the kinds and addition amounts of the alkylene glycol and the surfactant were properly changed and that the addition amount of water was properly changed such that the total sum of the respective starting materials was 100 parts by weight as shown in the following Table 1.

(Sample 13)

In Sample 13, a yellow ink and a black ink were respectively prepared in the same manner as in Sample 1, except that the alkylene glycol such as 1,2-pentanediol, 1,2-hexane-diol or 1,3-hexanediol was not contained and that the addition amount of water was properly changed such that the total sum of the respective starting materials was 100 parts by weight.

(Sample 14)

In Sample 14, a yellow ink and a black ink were respectively prepared in the same manner as in Sample 1, except that the surfactant was not contained and that the addition amount of water was properly changed such that the total sum of the respective starting materials was 100 parts by weight.

(Samples 15 to 20)

In Samples 15 to 20, yellow inks and black inks were respectively prepared in the same manner as in Sample 1, except that the kinds and addition amounts of the alkylene glycol and the surfactant were properly changed and that the addition amount of water was properly changed such that the total sum of the respective starting materials was 100 parts by weight as shown in the following Table 1.

A composition, a zero second dynamic surface tension and a static surface tension of the ink of each of the samples are shown in the following Table 1. With respect to the zero second dynamic surface tension and the static surface tension of each of the samples, a zero second dynamic surface tension and a static surface tension at 25° C. were measured by using a surface tensiometer (CBVP-Z), manufactured by Kyowa Interface Science Co., Ltd. In all of the samples, a value of the zero second dynamic surface tension is a measured value of the solvent from which the coloring matter and the surfactant are eliminated. A value of the static surface tension is a measured value after preparing a black ink and a yellow ink, respectively.

TABLE 1

| Sample | Alkylene glycol | Addition amount | Surfactant | Addition amount (weight part) |
|---|---|---|---|---|
| Sample 1 | 1,2-Hexanediol | 3 | ED adduct of 2-ethylhexyl monoalcohol (Addition molar number of ED: 4) | 0.5 |
| Sample 2 | 1,2-Hexanediol | 3 | ED adduct of 2-ethylhexyl monoalcohol (Addition molar number of ED: 4) | 0.1 |
| Sample 3 | 1,2-Hexanediol | 2.5 | ED adduct of 2-ethylhexyl monoalcohol (Addition molar number of ED: 4) | 0.2 |
| Sample 4 | 1,2-Hexanediol | 4.5 | ED adduct of 2-ethylhexyl monoalcohol (Addition molar number of ED: 4) | 0.5 |
| Sample 5 | 1,2-Pentanediol | 6 | ED adduct of 2-ethylhexyl monoalcohol (Addition molar number of ED: 4) | 0.5 |
| Sample 6 | 1,2-Pentanediol | 10 | ED adduct of 2-ethylhexyl monoalcohol (Addition molar number of ED: 4) | 0.2 |
| Sample 7 | 1,3-Hexanediol | 5.5 | ED adduct of 2-ethylhexyl monoalcohol (Addition molar number of ED: 4) | 0.5 |
| Sample 8 | 1,3-Hexanediol | 10 | ED adduct of 2-ethylhexyl monoalcohol (Addition molar number of ED: 4) | 0.2 |
| Sample 9 | 1,2-Hexanediol | 3 | ED adduct of 2,2-diethyl-1,5-pentanediol (Addition molar number of ED: 4) | 0.5 |
| Sample 10 | 1,2-Hexanediol | 3 | ED adduct of 2-ethyl-1,3-hexanediol (Addition molar number of ED: 4) | 0.5 |
| Sample 11 | 1,2-Hexanediol | 3 | ED adduct of 2-ethyl-2-n-butyl-1,3-propanediol (Addition molar number of ED: 4) | 0.5 |
| Sample 12 | 1,2-Pentanediol | 6 | ED adduct of 2-ethyl-2-n-butyl-1,3-propanediol (Addition molar number of ED: 4) | 0.5 |
| Sample 13 | Nil | 0 | ED adduct of 2-ethylhexyl monoalcohol (Addition molar number of ED: 4) | 0.5 |
| Sample 14 | 1,2-Hexanediol | 3 | Nil | 0 |
| Sample 15 | 1,6-Hexanediol | 3 | ED adduct of 2-ethylhexyl monoalcohol (Addition molar number of ED: 4) | 0.5 |
| Sample 16 | 2-Methyl-2,4-pentanediol | 3 | ED adduct of 2-ethylhexyl monoalcohol (Addition molar number of ED: 4) | 0.5 |
| Sample 17 | 1,2-Hexanediol | 2 | ED adduct of 2-ethylhexyl monoalcohol (Addition molar number of ED: 4) | 0.5 |
| Sample 18 | 1,2-Hexanediol | 5.5 | ED adduct of 2-ethylhexyl monoalcohol (Addition molar number of ED: 4) | 0.5 |
| Sample 19 | 1,2-Hexanediol | 3 | ED adduct of 2-ethylhexyl monoalcohol (Addition molar number of ED: 4) | 3.5 |
| Sample 20 | 1,2-Hexanediol | 3 | ED adduct of 2-ethylhexyl monoalcohol (Addition molar number of ED: 4) | 0.05 |

| | Yellow | | | Black | | |
|---|---|---|---|---|---|---|
| Sample | $\gamma_{dst0}$ (mN/m) | $\gamma_{sst}$ (mN/m) | $\gamma_{dst0} - \gamma_{sst}$ (mN/m) | $\gamma_{dst0}$ (mN/m) | $\gamma_{sst}$ (mN/m) | $\gamma_{dst0} - \gamma_{sst}$ (mN/m) |
| Sample 1 | 39 | 36.1 | 2.9 | 39 | 36 | 3 |
| Sample 2 | 39 | 38 | 1 | 39 | 37.9 | 1.1 |
| Sample 3 | 40 | 38 | 2 | 40 | 37.8 | 2.2 |
| Sample 4 | 35.1 | 33.5 | 1.6 | 35.1 | 33.3 | 1.8 |
| Sample 5 | 39.9 | 37.1 | 2.8 | 39.9 | 36.9 | 3 |
| Sample 6 | 37.4 | 36 | 1.4 | 37.4 | 35.7 | 1.7 |
| Sample 7 | 39.5 | 37 | 2.5 | 39.5 | 37 | 2.5 |
| Sample 8 | 37.2 | 35.9 | 1.3 | 37.2 | 35.7 | 1.5 |
| Sample 9 | 39 | 37.2 | 1.8 | 39 | 37 | 2 |
| Sample 10 | 39 | 37.9 | 1.1 | 39 | 37.6 | 1.4 |
| Sample 11 | 39 | 37.5 | 1.5 | 39 | 37.5 | 1.5 |
| Sample 12 | 39.9 | 37.7 | 2.2 | 39.9 | 37.6 | 2.3 |
| Sample 13 | 54.5 | 39.2 | 15.3 | 54.5 | 39 | 15.5 |
| Sample 14 | 39 | 38.7 | 0.3 | 39 | 38.9 | 0.1 |
| Sample 15 | 48.6 | 39.2 | 9.4 | 48.6 | 39.1 | 9.5 |
| Sample 16 | 49.2 | 39.4 | 9.8 | 49.2 | 39.4 | 9.8 |
| Sample 17 | 44.1 | 39.2 | 4.9 | 44.1 | 39.1 | 5 |
| Sample 18 | 33.4 | 32.6 | 0.8 | 33.4 | 32.5 | 0.9 |
| Sample 19 | 39 | 33.8 | 5.2 | 39 | 33.6 | 5.4 |
| Sample 20 | 39 | 38.5 | 0.5 | 39 | 38.4 | 0.6 |

With respect to the respective samples, the print density, the bleeding of boundaries, the unevenness of mixed color and the strike through of image were evaluated. The evaluation results are shown in the following Table 2.

TABLE 2

| Sample | Print density | Bleeding of boundaries | Unevenness of mixed color | Strike through of image |
|---|---|---|---|---|
| Sample 1 | 1.18 | B | B | B |
| Sample 2 | 1.17 | B | B | A |
| Sample 3 | 1.18 | B | B | B |
| Sample 4 | 1.15 | A | B | B |
| Sample 5 | 1.18 | B | B | B |
| Sample 6 | 1.16 | A | B | B |
| Sample 7 | 1.18 | B | B | B |
| Sample 8 | 1.19 | A | B | B |
| Sample 9 | 1.19 | A | B | A |
| Sample 10 | 1.2 | A | B | A |
| Sample 11 | 1.21 | A | A | A |
| Sample 12 | 1.22 | A | A | A |
| Sample 13 | 1.1 | D | D | C |
| Sample 14 | 1.11 | C | D | B |
| Sample 15 | 1.14 | C | D | B |
| Sample 16 | 1.14 | D | D | B |
| Sample 17 | 1.13 | C | C | B |
| Sample 18 | 1.09 | A | B | D |
| Sample 19 | 1.15 | B | B | D |
| Sample 20 | 1.16 | B | C | B |

The print density was evaluated in the following manner. That is, the black ink of each of the samples was filled in the foregoing ink cartridge and installed in a head cartridge and then subjected to black solid printing on copying paper which is plain paper of Fuji Xerox Co., Ltd. (a trade name: P PAPER) as recording paper by using a line type inkjet printer device. The resulting image was measured for reflection print density by using a Macbeth's optical densitometer (TR924).

The bleeding of boundaries was evaluated in the following manner. That is, the yellow ink and the black ink of each of the samples were respectively filled in the foregoing ink cartridge and installed in a head cartridge and then subjected to solid printing adjacent to each other on copying paper which is plain paper of Fuji Xerox Co., Ltd. (a trade name: P PAPER) as recording paper by using a line type inkjet printer device. The state of bleeding of boundaries of each color in the printed image was evaluated by visual observation.

In the evaluation of the bleeding of boundaries, the case where bleeding of each color is not found at all in boundaries is defined as "A"; the case where though there is no problem in the image quality, bleeding of each color is found a little in boundaries is defined as "B"; the case where bleeding of each color is found in boundaries to such a degree that the image quality is deteriorated is defined as "C"; and the case where bleeding of each color is found in the whole of boundaries and the image quality is remarkably deteriorated is defined as "D".

The unevenness of mixed color was evaluated in the following manner. That is, the yellow ink and the black ink of each of the samples were respectively filled in the foregoing ink cartridge and installed in a head cartridge, and the respective colors were subjected to solid printing with a density of 80% such that they were superposed on each other on copying paper which is plain paper of Fuji Xerox Co., Ltd. (a trade name: P PAPER) as recording paper by using a line type inkjet printer device. Then, uniformity of color density in the printed image, namely the presence or absence of unevenness of color was evaluated by visual observation.

In the evaluation of the unevenness of mixed color, the case where unevenness of color is not found at all in the image solid-painted in mixed color is defined as "A"; the case where though there is no problem in the image quality, unevenness of color is slightly found in the image is defined as "B"; the case where unevenness of color is found to such a degree that the image quality is deteriorated is defined as "C"; and the case where unevenness of color is found on the whole of the image and the image quality is remarkably deteriorated is defined as "D".

The strike through of image was evaluated in the following manner. That is, the printed image as prepared in the foregoing evaluation of bleeding of boundaries was visually observed from the back side of the printed face, thereby evaluating the state of strike through of image and the bleeding of ink.

In the evaluation of the strike through of image, the case where the strike through of image is a little is defined as "A"; the case where though the strike through of image is observed, there is no problem in the grade is defined as "B"; the case where the strike through is partially observed, for example, the ink comes out in a spot state and bleeding is observed is defined as "C"; and the case where the whole of the image causes strike through is defined as "D".

From the results as shown in Table 2, the yellow and black inks of Samples 1 to 12 were good in all of the evaluations of the print density, the bleeding of boundaries, unevenness of mixed color and the strike through of image as compared with the yellow and black inks of Samples 13 to 20.

In Samples 1 to 12, by containing an alkylene glycol such as 1,2-pentanediol, 1,2-hexanediol and 1,3-hexanediol, the zero second dynamic surface tension ($\gamma_{dst0}$) is adjusted at 35 mN/m or more and not more than 40 mN/m; and by containing a surfactant, the static surface tension ($\gamma_{sst}$) is satisfied with the following numerical expression (1).

$$(\gamma_{dst0}-3) \leq \gamma_{sst} \leq (\gamma_{dst0}-1) \tag{1}$$

In Table 1, the foregoing numerical expression (1) was expressed by the following numerical expression (4) and evaluated in terms of a static surface tension ($\gamma_{sst}$).

$$1 \leq (\gamma_{dst0} - \gamma_{sst}) \leq 3 \tag{4}$$

In Samples 1 to 12, the zero second dynamic surface tension ($\gamma_{dst0}$) is 35 mN/m or more and not more than 40 mN/m; and the static surface tension ($\gamma_{sst}$) is satisfied with the numerical expression (4), namely the numerical expression (1) Accordingly, since the ink causes neither excessive permeation nor slow permeation in the thickness direction of the recording paper, it uniformly penetrates into the recording paper. Thus, in Samples 1 to 12, the print density was high, the bleeding of boundaries and unevenness of mixed color and the strike through could be prevented from occuring, and all of the evaluations were good.

In particular, of Samples 1 to 12, Samples 9 and 10 in which an ethylene oxide adduct of an alkylene glycol having 8 or 9 carbon atoms was chosen as the kind of the surfactant were much more excellent in both the evaluations of the bleeding of boundaries and strike through as compared with Samples 1 to 8 in which 2-ethylhexyl monoalcohol was used in place of the alkylene glycol.

In addition, Samples 11 and 12 in which an ethylene oxide adduct of 2-ethyl-2-n-butyl-1,3-propanediol represented by the foregoing chemical formula (1) was used were much more excellent in all of the evaluations of the print density, the bleeding of boundaries and unevenness of mixed color and the strike through as compared with Samples 1 to 10.

In contrast to these Samples 1 to 12, in Sample 13, since an alkylene glycol such as 1,2-pentanediol, 1,2-hexanediol or 1,3-hexanediol was not contained, both the yellow ink and the black ink could not reduce the zero second dynamic surface tension; bleeding of boundaries and unevenness of mixed color were caused; and the print density was low.

In Sample 14, since a surfactant was not contained, a value of the static surface tension ($\gamma_{sst}$) was larger than {[zero second dynamic surface tension ($\gamma_{dst0}$)]−1}; a time difference between wet spreading on a surface of a surface or internal sizing agent in the recording paper and wet spreading onto cellulose fiber surfaces, gaps formed by intertwining among cellulose fibers, inorganic filler surfaces became large; and unevenness of mixed color and bleeding of boundaries were caused.

In Samples 15 and 16, since 1,6-hexanediol or 2-methyl-2,4-pentanediol was contained in the alkylene glycol and the kind of the alkylene glycol was not appropriate, the zero second dynamic surface tension was high; the print density was low; and bleeding of boundaries and unevenness of mixed color were caused.

In Sample 17, since the addition amount of 1,2-hexanediol was less than 2.5% by weight, the zero second dynamic surface tension was high; the permeation in the thickness direction of the recording paper was slow; bleeding of boundaries and unevenness of mixed color were caused; and the print density was low.

In Sample 18, since the addition amount of 1,2-hexanediol was more than 4.5% by weight, the zero second dynamic surface tension was excessively low; the permeation in the thickness direction of the recording paper was in excess; the print density was low; and strike through of the image was caused.

In Sample 19, since the addition amount of the surfactant was in excess, the static surface tension excessively dropped from the zero second dynamic surface tension value; and strike through of the image became worse.

In Sample 20, since the addition amount of the surfactant was too low, a difference between the zero second dynamic surface tension value and the static surface tension was too small so that the unevenness of mixed color could not be satisfactorily improved.

From the fact that Samples 1 to 12 were good in all the evaluations as compared with Samples 13 to 20, it is understood that by preparing an ink by using an alkylene glycol other than 1,6-hexanediol or 2-methyl-2,4-pentanediol to adjust the zero second dynamic surface tension at 35 mN/m or more and not more than 40 mN/m and using a surfactant to adjust the static surface tension such that it is satisfied with the numerical expression (1), especially when plain paper is used as recording paper, a high print density is obtained, and bleeding of boundaries and unevenness of mixed color and strike through can be prevented from occurring.

It should be understood by those skilled in the art that various modifications, combinations, sub-combinations and alternations may occur depending on design requirements and other factors insofar as they are within the scope of the appended claims or the equivalents thereof.

What is claimed is:

1. A recording liquid to be attached in a droplet state to an object for the purpose of recording on the object, comprising:
    at least one alkylene glycol selected from 1,2-pentanediol, 1,2-hexanediol and 1,3-hexanediol, thereby adjusting a zero second dynamic surface tension thereof at 35 mN/m or more and not more than 40 mN/m, and
    a surfactant, thereby adjusting a static surface tension thereof which is satisfied with the following numerical expression (1):

$$(\gamma_{dst0}-3) \leqq \gamma_{sst} \leqq (\gamma_{dst0}-1) \quad (1)$$

wherein $\gamma_{dst0}$ [mN/m] represents a zero second dynamic surface tension; and $\gamma_{sst}$ [mN/m] represents a static surface tension.

2. The recording liquid according to claim 1, wherein the surfactant is an ethylene oxide adduct of an alkylene glycol having 8 or 9 carbon atoms.

3. The recording liquid according to claim 2, wherein the surfactant is an ethylene oxide adduct of an alkylene glycol represented by the following chemical formula (1):

wherein m and n each represents an integer of from 0 to 10 and are satisfied with the relation of [1≦(m+n)≦10].

4. A liquid cartridge having a recording liquid to be attached in a droplet state to an object for the purpose of recording on the object accommodated therein, the recording liquid comprising:
    at least one alkylene glycol selected from 1,2-pentanediol, 1,2-hexanediol and 1,3-hexanediol, thereby adjusting a zero second dynamic surface tension thereof at 35 mN/m or more and not more than 40 mN/m, and
    a surfactant, thereby adjusting a static surface tension thereof which is satisfied with the following numerical expression (1):

$$(\gamma_{dst0}-3) \leqq \gamma_{sst} \leqq (\gamma_{dst0}-1) \quad (1)$$

wherein $\gamma_{dst0}$ [mN/m] represents a zero second dynamic surface tension; and $\gamma_{sst}$ [mN/m] represents a static surface tension.

5. The liquid cartridge according to claim 4, wherein the surfactant is an ethylene oxide adduct of an alkylene glycol having 8 or 9 carbon atoms.

6. The liquid cartridge according to claim 5, wherein the surfactant is an ethylene oxide adduct of an alkylene glycol represented by the following chemical formula (1):

wherein m and n each represents an integer of from 0 to 10 and are satisfied with the relation of [1≦(m+n)≦10].

7. A liquid discharge device for discharging a recording liquid to be attached in a droplet state to an object for the purpose of recording on the object, comprising:
    a device main body,
    a liquid cartridge having a recording liquid accommodated therein, and
    a liquid discharge head connected to the subject liquid cartridge and having a feed passage for feeding the recording liquid accommodated in the liquid cartridge into a liquid compartment provided with a pressure producing element for pressing the recording liquid and a discharge nozzle for discharging the recording liquid, wherein the recording liquid contains:

at least one alkylene glycol selected from 1,2-pentanediol, 1,2-hexanediol and 1,3-hexanediol, thereby adjusting a zero second dynamic surface tension thereof at 35 mN/m or more and not more than 40 mN/m, and a surfactant, thereby adjusting a static surface tension thereof which is satisfied with the following numerical expression (1):

$$(\gamma_{dst0}-3) \leqq \gamma_{sst} \leqq (\gamma_{dst0}-1) \qquad (1)$$

wherein $\gamma_{dst0}$ [mN/m] represents a zero second dynamic surface tension; and $\gamma_{sst}$ [mN/m] represents a static surface tension.

8. The liquid discharge device according to claim 7, wherein the surfactant is an ethylene oxide adduct of an alkylene glycol having 8 or 9 carbon atoms.

9. The liquid discharge device according to claim 8, wherein the surfactant is an ethylene oxide adduct of an alkylene glycol represented by the following chemical formula (1):

(1)

wherein m and n each represents an integer of from 0 to 10 and are satisfied with the relation of $[1 \leqq (m+n) \leqq 10]$.

10. A liquid discharge method by a liquid discharge device for discharging a recording liquid to be attached in a droplet state to an object for the purpose of recording on the object, wherein the liquid discharge device includes:

a device main body, a liquid cartridge having a recording liquid accommodated therein, and a liquid discharge head connected to the subject liquid cartridge and having a feed passage for feeding the recording liquid accommodated in the liquid cartridge into a liquid compartment provided with a pressure producing element for pressing the recording liquid and a discharge nozzle for discharging the recording liquid, the recording liquid contains:

at least one alkylene glycol selected from 1,2-pentanediol, 1,2-hexanediol and 1,3-hexanediol, thereby adjusting a zero second dynamic surface tension thereof at 35 mN/m or more and not more than 40 mN/m, and a surfactant, thereby adjusting a static surface tension thereof which is satisfied with the following numerical expression (1):

$$(\gamma_{dst0}-3) \leqq \gamma_{sst} \leqq (\gamma_{dst0}-1) \qquad (1)$$

wherein $\gamma_{dst0}$ [mN/m] represents a zero second dynamic surface tension; and $\gamma_{sst}$ [mN/m] represents a static surface tension, and the recording liquid in a droplet state being discharged from the discharge nozzle by driving the pressure producing element.

11. The liquid discharge method according to claim 10, wherein the surfactant is an ethylene oxide adduct of an alkylene glycol having 8 or 9 carbon atoms.

12. The liquid discharge method according to claim 11, wherein the surfactant is an ethylene oxide adduct of an alkylene glycol represented by the following chemical formula (1):

(1)

wherein m and n each represents an integer of from 0 to 10 and are satisfied with the relation of $[1 \leqq (m+n) \leqq 10]$.

* * * * *